United States Patent
Böhnke et al.

(10) Patent No.: US 10,780,375 B2
(45) Date of Patent: Sep. 22, 2020

(54) LIQUID FILTRATION APPARATUS

(71) Applicant: OUTOTEC (FINLAND) OY, Espoo (FI)

(72) Inventors: Bernd Böhnke, Düsseldorf (DE); Kari Vänttinen, Espoo (FI); Saku Eronen, Lappeenranta (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/793,109

(22) Filed: Feb. 18, 2020

(65) Prior Publication Data
US 2020/0179831 A1   Jun. 11, 2020

Related U.S. Application Data

(63) Continuation of application No. PCT/FI2017/050591, filed on Aug. 23, 2017.

(51) Int. Cl.
| | | |
|---|---|---|
| *B01D 25/164* | (2006.01) | |
| *F16J 15/02* | (2006.01) | |
| *B01D 25/32* | (2006.01) | |

(52) U.S. Cl.
CPC ......... *B01D 25/164* (2013.01); *B01D 25/322* (2013.01); *F16J 15/028* (2013.01); *B01D 2201/342* (2013.01)

(58) Field of Classification Search
None
See application file for complete search history.

(56) References Cited

U.S. PATENT DOCUMENTS

| | | | |
|---|---|---|---|
| 3,117,083 A | 1/1964 | Przhilensky | |
| 7,938,183 B2 * | 5/2011 | Hart | E21B 43/2408 166/272.3 |

FOREIGN PATENT DOCUMENTS

| | | |
|---|---|---|
| CN | 101961569 A | 2/2011 |
| CN | 203525388 U | 4/2014 |
| EP | 0479315 A1 | 4/1992 |
| JP | S59216609 A | 12/1984 |

OTHER PUBLICATIONS

International Search Report issued by the Finnish Patent and Registration Office acting as the International Searching Authority in relation to International Application No. PCT/FI2017/050591 dated Jan. 8, 2018 (6 pages).

Written Opinion of the International Searching Authoirty issued by the Finnish Patent and Registration Office acting as the International Searching Authority in relation to International Application No. PCT/FI2017/050591 dated Jan. 8, 2018 (7 pages).

* cited by examiner

*Primary Examiner* — Chester T Barry
(74) *Attorney, Agent, or Firm* — Robert P. Michal, Esq.; Carter, DeLuca & Farrell LLP

(57) ABSTRACT

A liquid filtration apparatus includes a series of upright filter plates forming a filter plate pack. Filtering spaces are formed in the filter plate pack. The liquid filtration apparatus includes at least one filtering space and a filter chamber that is at least partly limited laterally by a filter media. The at least one filtering space has an elongated bottom discharge opening at a level below the filter chamber. The elongated bottom discharge opening is provided with a first openable and closable hatch arrangement and with a second openable and closable hatch arrangement extending across the elongated bottom discharge opening.

36 Claims, 11 Drawing Sheets

LIQUID FILTRATION APPARATUS

CROSS-REFERENCE TO RELATED APPLICATIONS

This application is a continuation of PCT International Application No. PCT/FI2017/050591 filed Aug. 23, 2017, the disclosure of this application is expressly incorporated herein by reference in its entirety.

FIELD OF THE INVENTION

The invention relates to a liquid filtering apparatus.

More precisely, the invention relates to a liquid filtration apparatus comprising a series of upright vertical filter plates forming a filter plate pack. Filtering spaces is formed in the filter plate pack and the liquid filtration apparatus comprises in at least one filtering space a filter chamber that is at least partly limited laterally by a filter media. Said at least one filtering space has an elongate bottom discharge opening that can be closed and opened by means of a first openable and closable hatch arrangement.

The liquid filtration apparatus can be configured to perform at least:

1. A filling stage, during which the elongate bottom discharge opening of said at least one filtering space is closed by means of the first openable and closable hatch arrangement and material to be filtered is fed into the filter chambers.

2. A filtration stage, during which the elongate bottom discharge opening of said at least one filtering space is closed by means of the first openable and closable hatch arrangement, and pressure is by means of a pressure arrangement exerted to the material in the filter chambers to cause liquid of the material to be pressed out of the material and to flow through the filter media and to form filter cake of the material in the filter chamber.

3. A discharge stage, during which the elongate bottom discharge opening is opened by means of the first openable and closable hatch arrangement to allow filter cake to fall by means of gravity out of said at least one filter chamber.

OBJECTIVE OF THE INVENTION

The object of the invention is to provide an improved liquid filtration apparatus.

SHORT DESCRIPTION OF THE INVENTION

The invention relates also to the use of the liquid filtration apparatus for filtering material in the form of tailings from mining, or in the form of products of bulk mining such as products containing iron, phosphate, or apatite. The volume of such material is normally big and such material contains a lot of water that can be recycled for re-use in the mining operation.

LIST OF FIGURES

Figure 1:
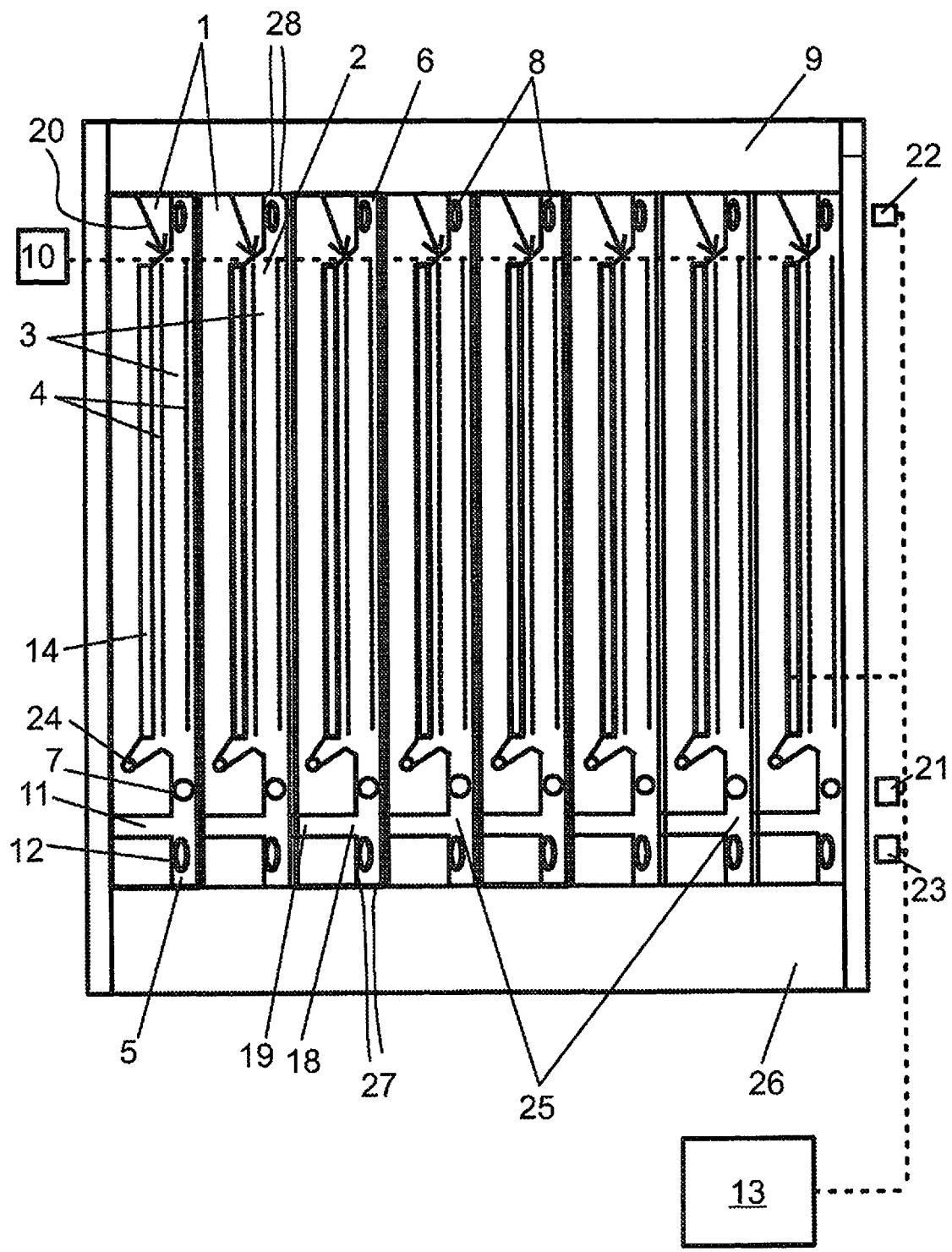
Figure 2:
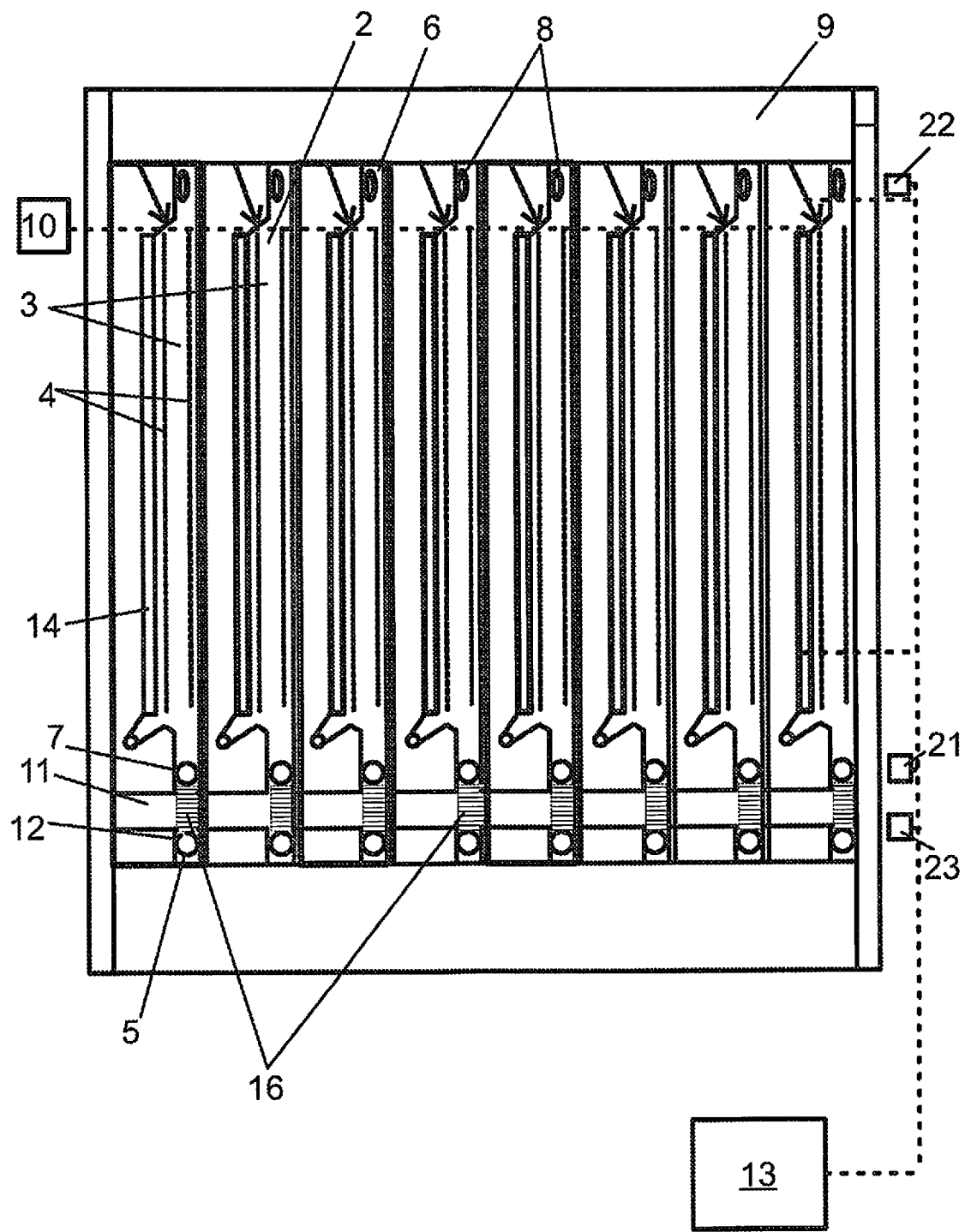
Figure 3:
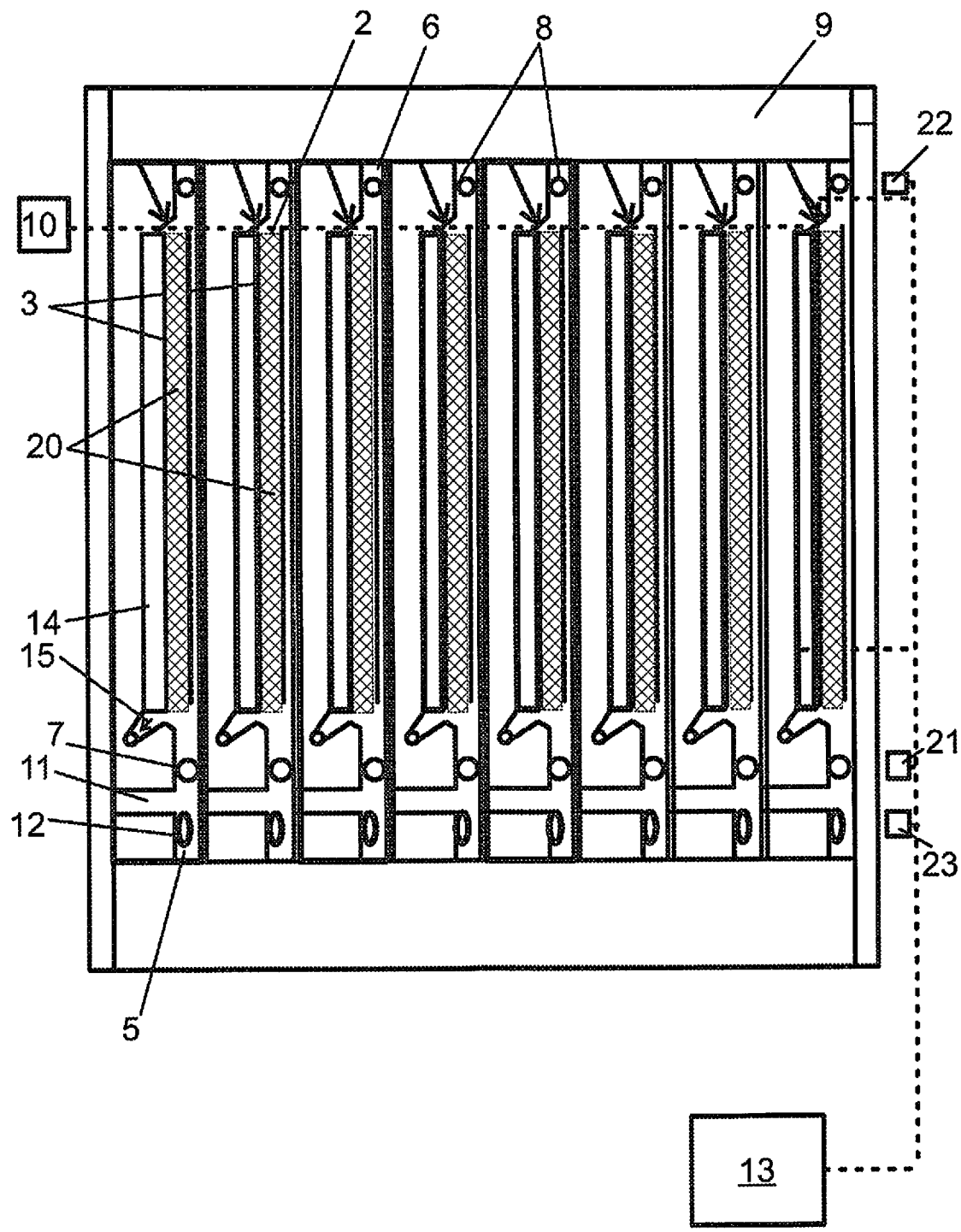
Figure 4:
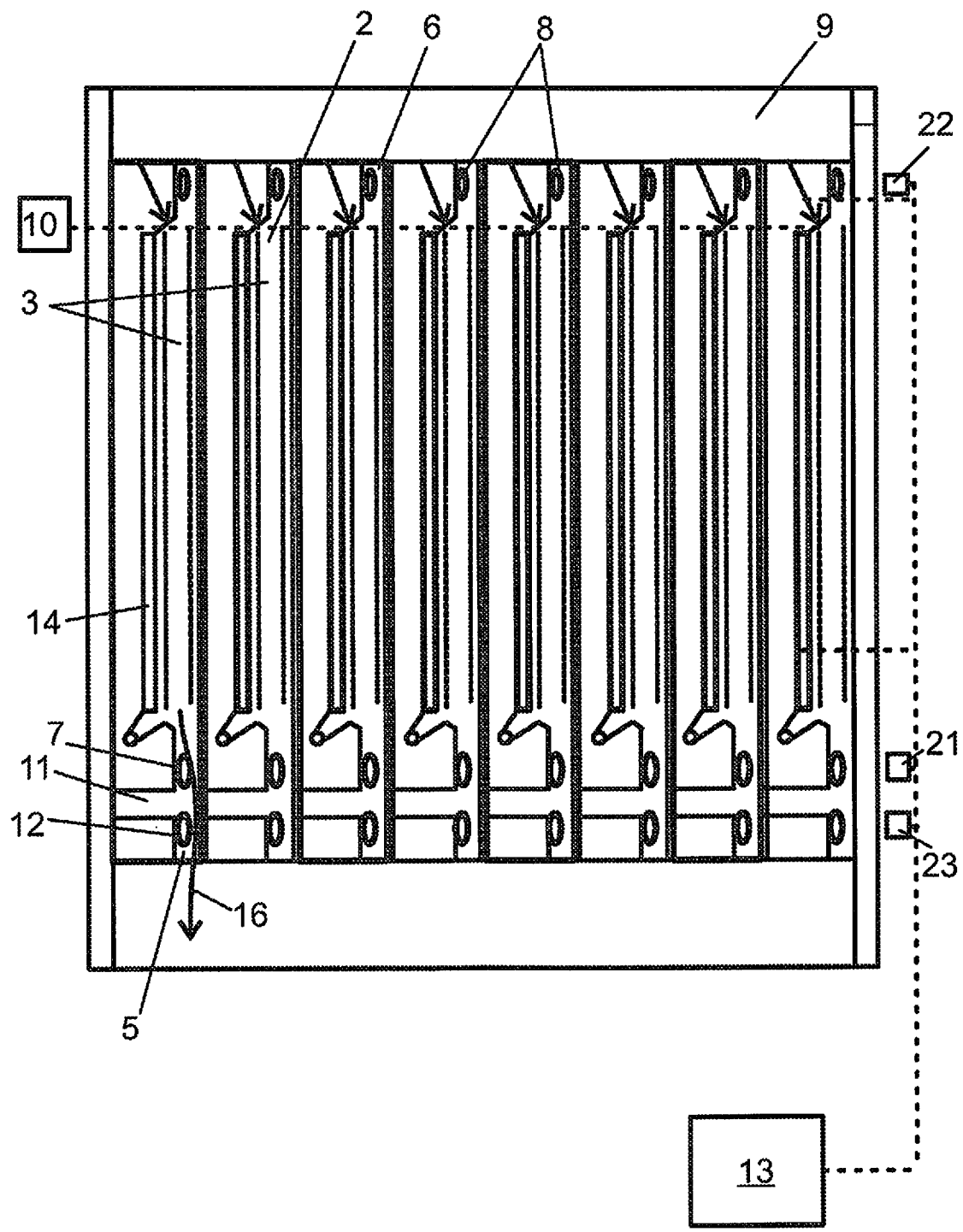
Figure 5:
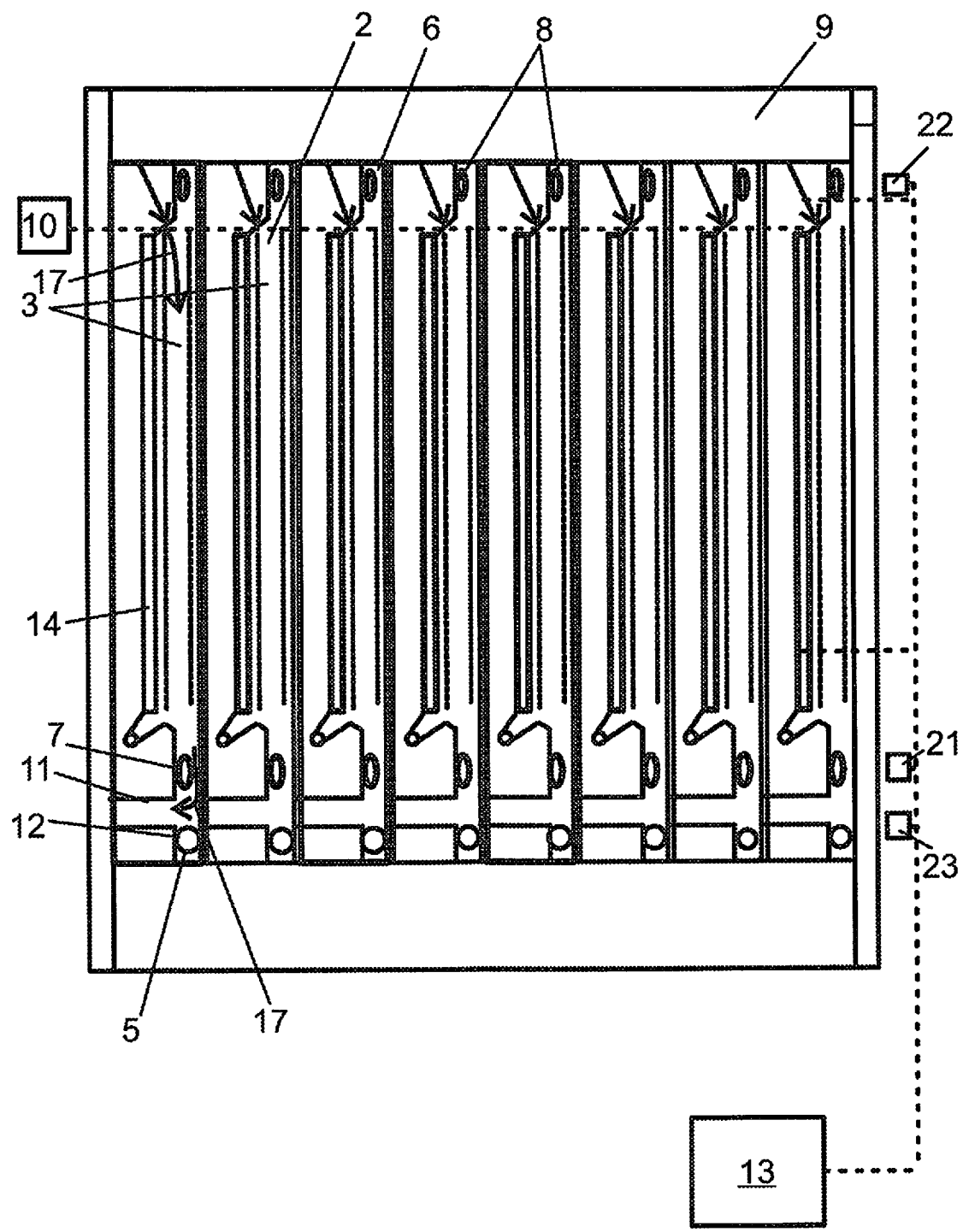
Figure 6:
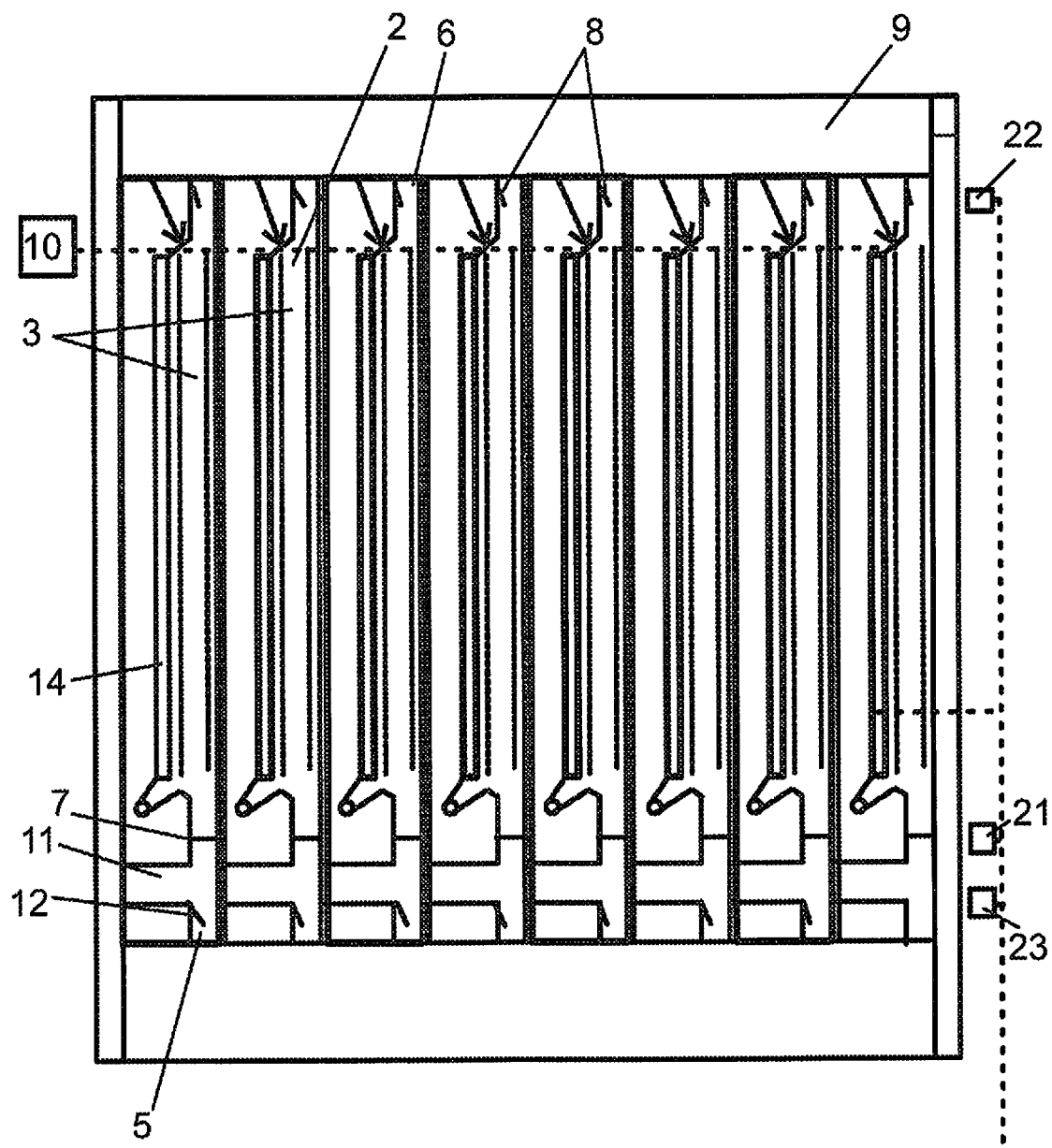
Figure 7:
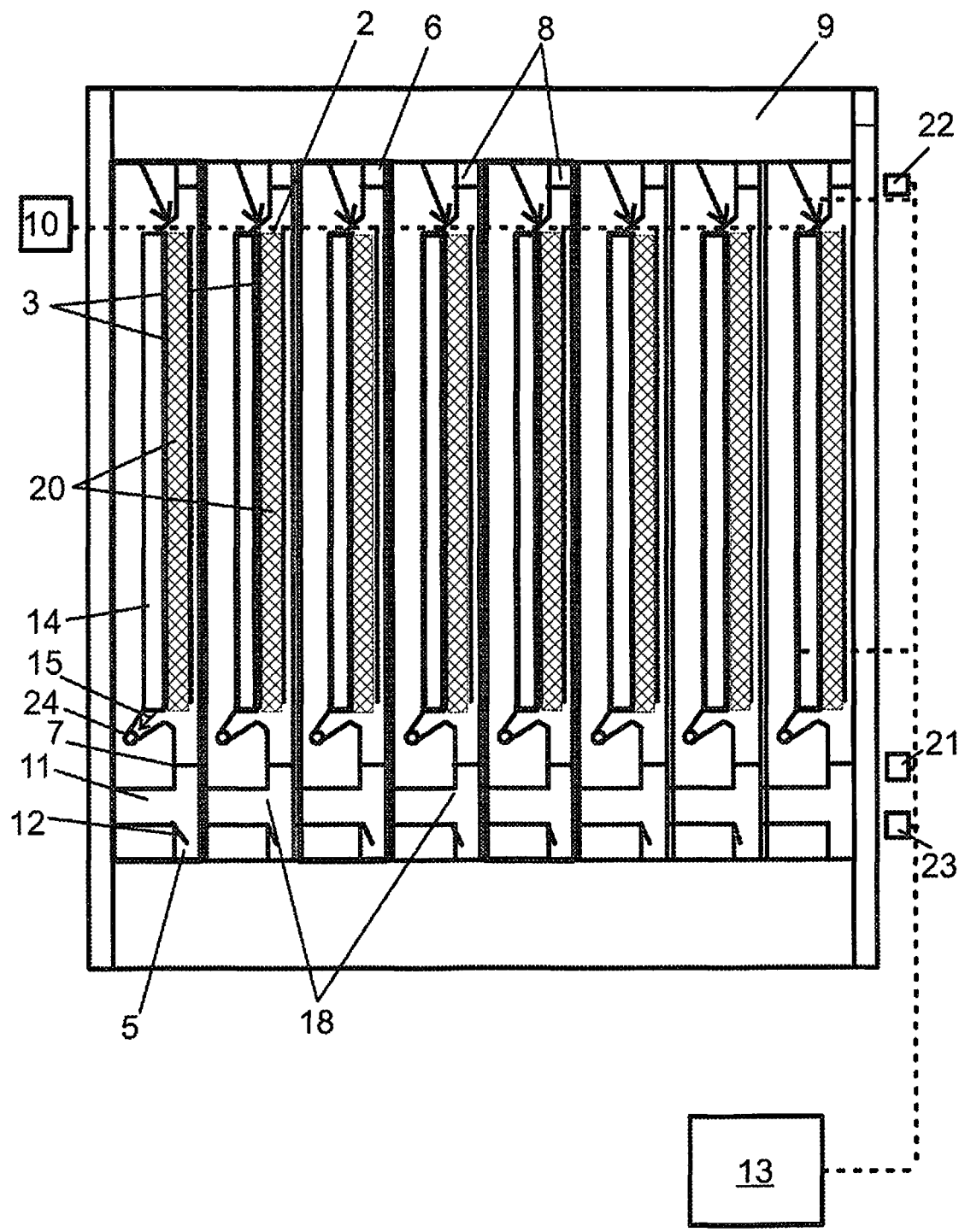
Figure 8:
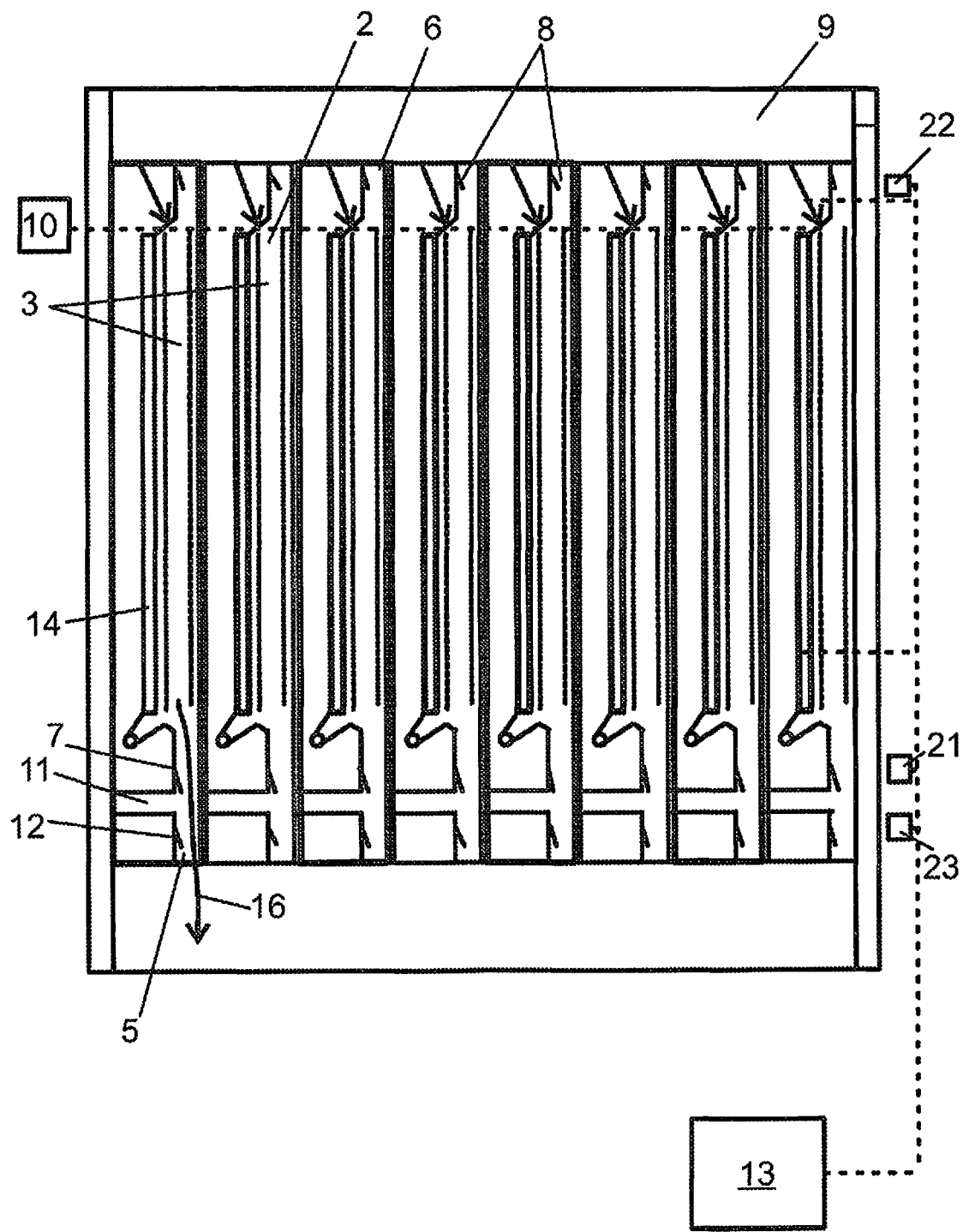
Figure 9:
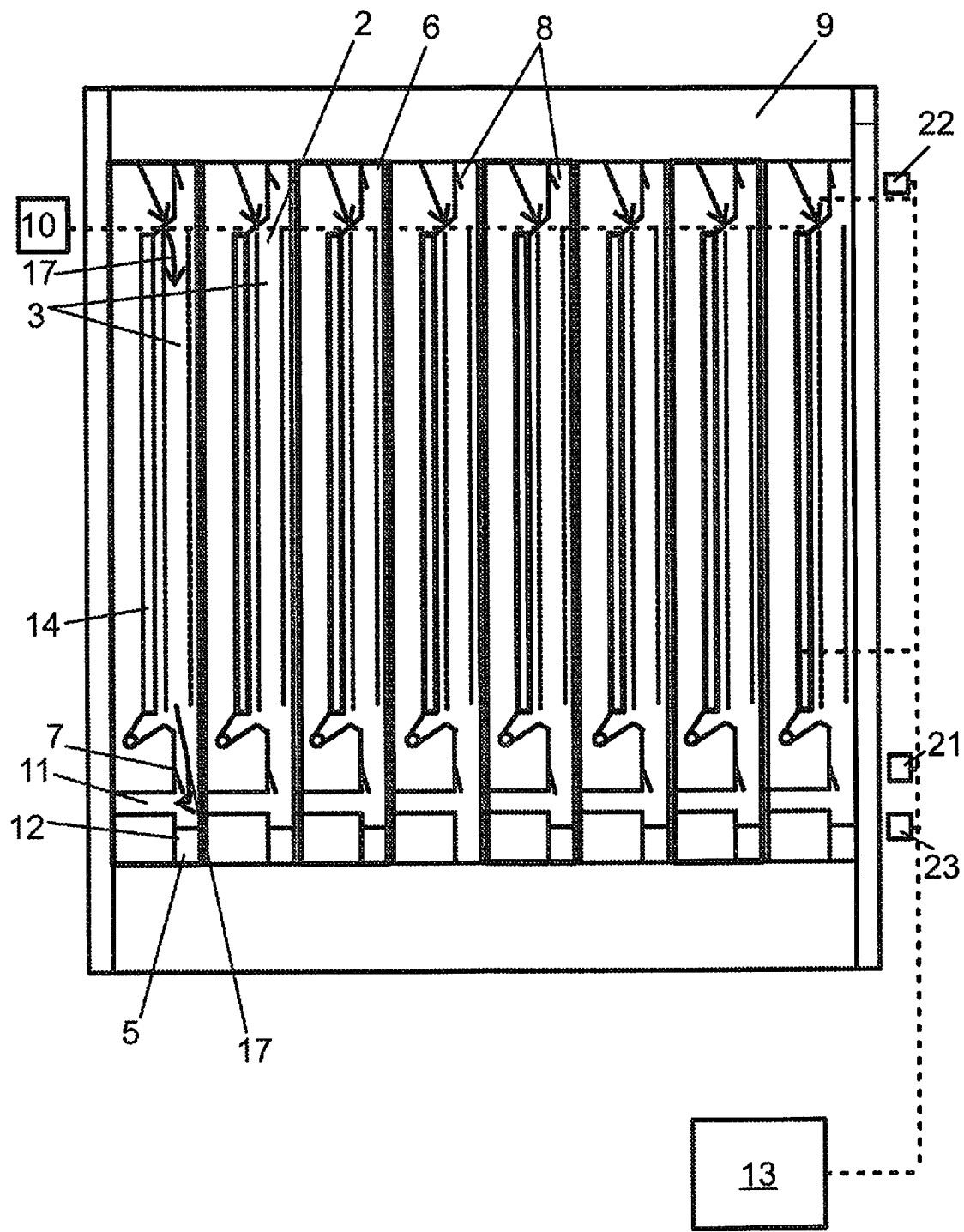
Figure 10:
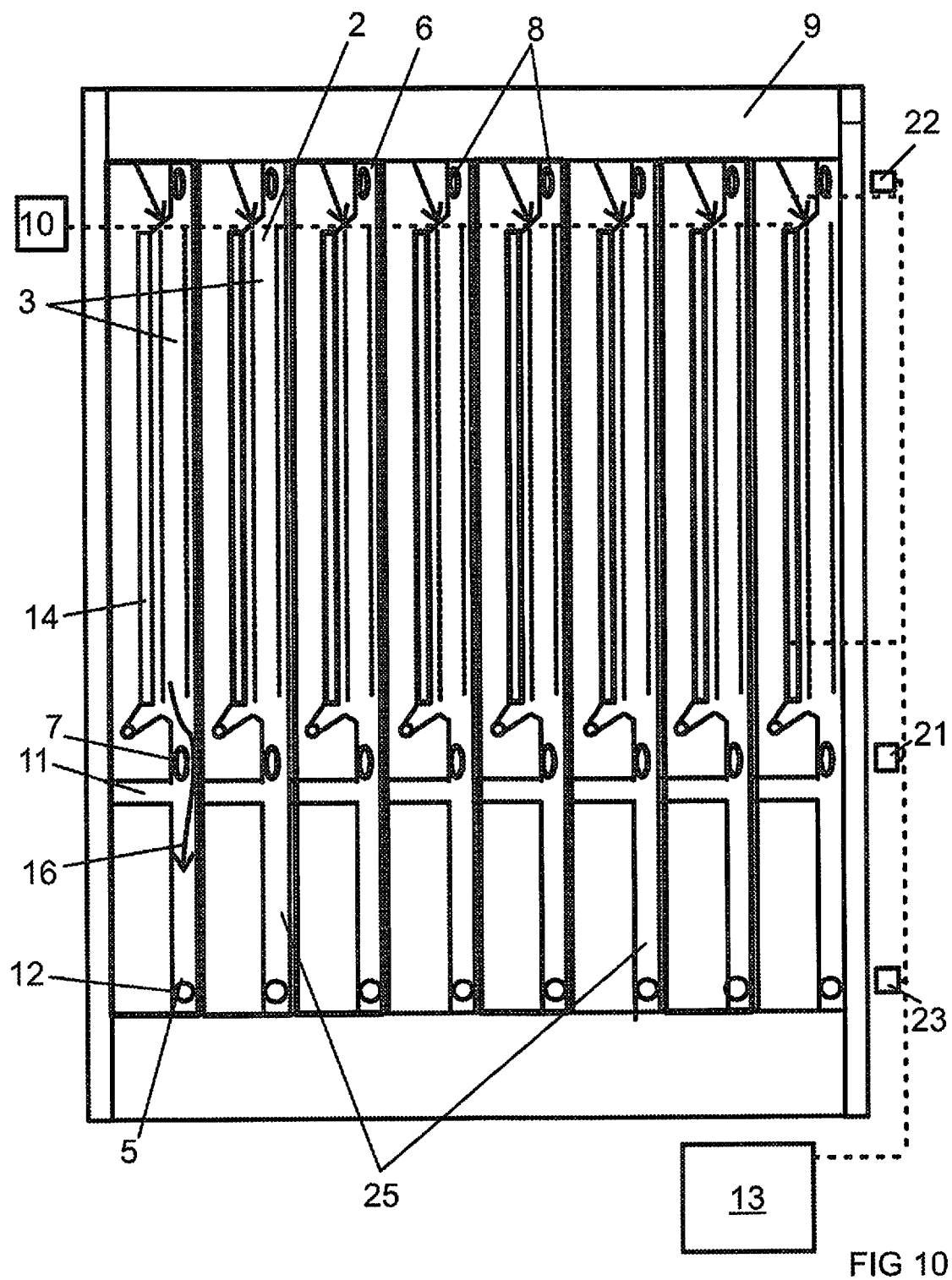
Figure 11:
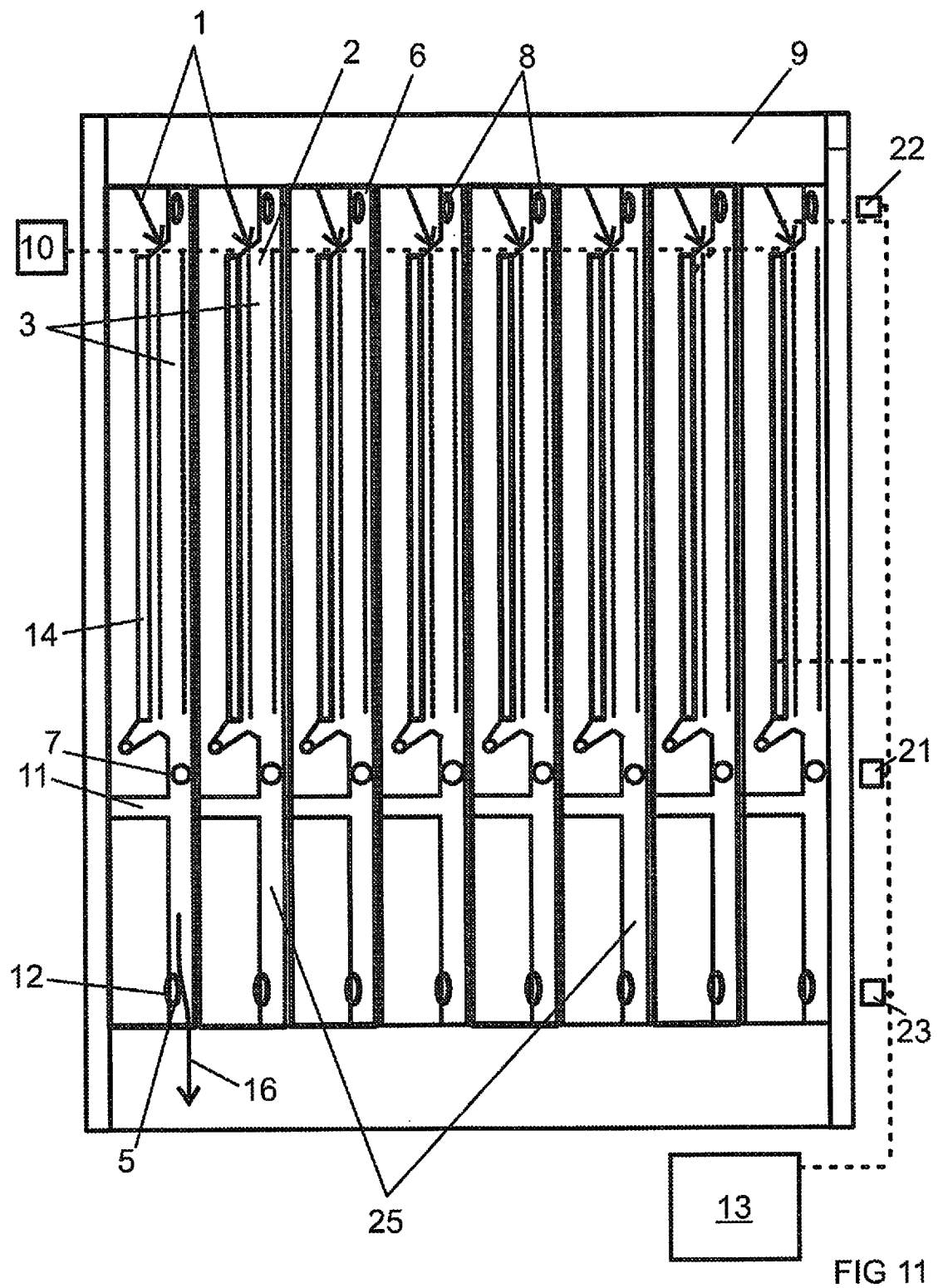

In the following the invention will described in more detail by referring to the figures, of which FIG. 1 is side view of a first embodiment of the filter press and shows the filling stage of the filter press, FIG. 2 is side view of a first embodiment of the filter press and shows an alternative setup during the filling stage of the filter press, FIG. 3 is side view of a first embodiment of the filter press and shows the filtration stage of the filter press, FIG. 4 is side view of a first embodiment of the filter press and shows the discharge stage of the filter press, FIG. 5 is side view of a first embodiment of the filter press and shows the flush stage of the filter press, FIG. 6 is side view of a second embodiment of the filter press and shows the filling stage of the filter press, FIG. 7 is side view of a second embodiment of the filter press and shows the filtration stage of the filter press, FIG. 8 is side view of a second embodiment of the filter press and shows the discharge stage of the filter press, FIG. 9 is side view of a second embodiment of the filter press and shows the flush stage of the filter press, FIG. 10 is side view of a third embodiment of the filter press and shows a sequence of the discharge stage of the filter press, and FIG. 11 is side view of a third embodiment of the filter press and shows a sequence of the discharge stage of the filter press.

DETAILED DESCRIPTION OF THE INVENTION

The liquid filtration apparatus comprises a series of upright vertical filter plates 1 forming a filter plate pack (not marked with a reference numeral).

The number of filter plates 1 in the filter plate pack can for example be between 10 and 100.

The upright filter plates 1 can, as shown in the figures, be arranged aligned and vertically in the filter plate pack The adjacent filter plates 1 can be arranged horizontally immovable in contact with each other in the filter plate pack, when the filter plates 1 forms the filter pack. Individual filter plates can however be removed from the filter plate pack for example for maintenance of filter plates 1, when the liquid filtration apparatus is not performing filtration of material.

Filtering spaces 2 is formed in the filter plate pack.

The filtering spaces 2 can be provided within the upright filter plates 1 of the filter plate pack and/or between two adjacent upright filter plates 1 of the filter plate pack.

The liquid filtration apparatus comprises in at least one filtering space 2 a filter chamber 3 that is at least partly limited laterally by a filter media 4. The liquid filtration apparatus comprises preferably, but not necessarily, a filter media 4 in each filtering space 2 of the filter plate pack.

Said at least one filtering space 2 have an elongated bottom discharge opening 5 at a level below the filter chamber 3. The bottom discharge opening 5 is limited by two opposite first side walls and optionally by two opposite first end walls. The liquid filtration apparatus comprises preferably a filter media 4 in each filtering space 2 of the filter plate pack and an elongated bottom discharge opening 5 below each filter chamber 3 of the filter plate pack.

The filtering space 2 can have an elongate top opening 6 at a level above the filter chamber 3. Such elongate top opening 6 is limited by two opposite second side walls and optionally by two opposite second end walls. The liquid filtration apparatus comprises preferably, but not necessarily, an elongated top opening 6 at a level above below each filter chamber 3 of the filter plate pack.

The elongated bottom discharge opening 5 of said at least one filtering space 2 is provided with a first openable and closable hatch arrangement 7 extending across the elongated bottom discharge opening 5 and configured to selectively open and close the elongated bottom discharge opening 5 at the first openable and closable hatch arrangement 7. Each elongated bottom discharge opening 5 of each filtering space 2 of the filter plate pack is preferably, but not necessarily, provided with a first openable and closable hatch arrangement 7 extending across the elongated bottom discharge opening 5 and configured to selectively open and close the elongated bottom discharge opening 5 at the first openable and closable hatch arrangement 7. The filter media 4 extends preferably, but not necessarily, to a level below the first openable and closable hatch arrangement 7 in the filtering space 2.

The liquid filtration apparatus comprises a material feeding arrangement 9 configured to feed material 20 into filter chambers 3 of the filter plate pack. The material feeding arrangement 9 can be configured to feed material 20 into each filter chamber 3 of the filter pack for example by pumping or by gravity.

The material 20 can for example be material in the form of tailings from mining, or in the form of products of bulk mining such as products containing iron, phosphate, or apatite.

The liquid filtration apparatus comprises a pressure arrangement 14 configured to exert pressure on material 20 fed into filter chambers 3 of the filter plate pack so as to separate liquid 15 from the material in filter chamber 3 of the filter plate pack and to produce filter cake 16 in filter chambers 3 of the filter plate pack. The pressure arrangement 14 can comprise a flexible and waterproof diaphragm (not shown in the figures). Alternatively or additionally can the material feeding arrangement 9 function as the/a pressure arrangement 14. In such case material 20 is fed into filter chambers 3 of the filter plate pack so that pressure is built-up in filter chambers 3 of the filter plate pack causing liquid of the material to be separated from the material and to pass through the filter media 4 so that filter cake is formed in the filter chambers 3 of the filter plate pack.

The liquid filtration apparatus comprises a flushing fluid feeding arrangement 10 configured to selectively feed flushing fluid 17 such as pressurized liquid, such as water, or gas into filtering spaces 2 of the filter plate pack.

Said at least one filtering space 2 comprising a flushing fluid drainage channel 11 having an inlet 18 and an outlet 19 so that the inlet 18 of the flushing fluid drainage channel 11 is in the elongated bottom discharge channel 5 of said at least one filtering space 2 and so the outlet 19 of each flushing fluid drainage channel 11 is on the outside of the elongated bottom discharge channel of said at least one filtering space 2. In the liquid filtration apparatus, each filtering space 2 comprises preferably, but not necessarily, a flushing fluid drainage channel 11 having an inlet 18 and an outlet 19 so that the inlet 18 of the flushing fluid drainage channel 11 is in the elongated bottom discharge channel 5 of the filtering space 2 and so the outlet 19 of each flushing fluid drainage channel 11 is on the outside of the elongated bottom discharge channel 5 of the filtering space 2.

The flushing fluid drainage channel(s) 11 can function as a part of the flushing fluid feeding arrangement 10 so that flushing fluid is fed into the filtering space(s) 2 of the filter plate pack via the flushing fluid drainage channel(s) 1.

The elongated bottom discharge opening 5 of said at least one filtering space 2 is provided with a second openable and closable hatch arrangement 12 extending across the elongated bottom discharge opening 5 at a level below the inlet 18 of the flushing fluid drainage channel 11 and a level below the filter chamber 3 and configured to selectively open and close the elongated bottom discharge opening 5 at the second openable and closable hatch arrangement 12. In the liquid filtration apparatus, the elongated bottom discharge opening 5 of each filtering space 2 is preferably, but not necessarily, provided with a second openable and closable hatch arrangement 12 extending across the elongated bottom discharge opening 5 at a level below the inlet 18 of the flushing fluid drainage channel 11 and a level below the filter chamber 3 and configured to selectively open and close the elongated bottom discharge opening 5 at the second openable and closable hatch arrangement 12.

The first openable and closable hatch arrangement 7 extends across the elongated bottom discharge opening 5 of said at least one filtering space 2 at a level above the inlet 18 of the flushing fluid drainage channel 11. In the liquid filtration apparatus, the first openable and closable hatch arrangement 7 extends preferably, but not necessarily, across the elongated bottom discharge opening 5 in each filtering space 2 at a level above the inlet 18 of the flushing fluid drainage channel 11

The liquid filtration apparatus comprises a steering arrangement 13 configured to operate the first openable and closable hatch arrangement(s) 7, the second openable and closable hatch arrangement(s) 12, the material feeding arrangement 9, the pressure arrangement(s) 14, and the flushing fluid feeding arrangement 10.

The steering arrangement 13 can be configured to operate first openable and closable hatch arrangement(s) 7, the second openable and closable hatch arrangement(s) 12, the material feeding arrangement 9, the pressure arrangement(s) 14, and the flushing fluid feeding arrangement 10 to perform at least:

1. A filling stage, during which the elongated bottom discharge opening(s) 5 are closed by means of the first openable and closable hatch arrangements 7 and material 20 is fed into the filter chamber(s) 3 from the material feeding arrangement 9.
2. A filtration stage, during which the elongated bottom discharge opening(s) 5 are closed by means of the first openable and closable hatch arrangement(s) 7, and pressure is by means of the pressure arrangement(s) 14 exerted to the material 20 in the filter chamber(s) 3 to cause liquid 15 of the material 20 to flow through the filter media 4 and to form filter cake 16 of the material 20 in the filter chamber(s) 3.
3. A discharge stage, during which the elongated bottom discharge opening(s) 5 is/are opened by means of the first openable and closable hatch arrangement(s) 7 and by means of the second openable and closable hatch arrangement(s) 12 to allow filter cake 16 to fall by means of gravity out of the filter chamber(s) 3.
4. A flush stage, during which flushing fluid 17 is fed into the filter chamber(s) 3 by means of the flushing fluid feeding arrangement(s) 10 and during which flushing fluid 17 is drained from the filter chamber(s) 3 into the flushing fluid drainage channel(s) 11 to clean the filter chamber(s) 3.

Each filter plates 1 comprise preferably liquid channels 24 configured to lead liquid 15 separated by pressing from material 20 in the filter chamber 3 from the filter plate pack.

The filter media 4 extend preferably, but not necessarily, to a level below the first openable and closable hatch arrangement 7 in each filtering space 2 of the filter plate pack.

The steering arrangement 13 can in a flush stage to clean the filter chamber(s) 3 be configured to for the elongated bottom discharge opening(s) 5 to (i) open the elongated bottom discharge opening 5 at the first openable and closable hatch arrangement 7 by means of first openable and closable hatch arrangement 7 to allow flushing fluid 17 to flow past the first openable and closable hatch arrangement 7, and (ii) close the elongated bottom discharge opening 5 at the second openable and closable hatch arrangement 12 to prevent flushing fluid 17 from flowing past the second openable and closable hatch arrangement 12 into a filter cake collector 26 below the filter plate pack and to cause flushing fluid 17 to flow into the flushing fluid drainage channel 11.

The steering arrangement 13 can be configured to prior opening the elongated bottom discharge opening 5 at the first openable and closable hatch arrangement 7 by means of the first openable and closable hatch arrangement 7 to operate the flushing fluid feeding arrangement 10 to fill the filter chamber(s) 3 completely with flushing fluid 17. This provides for a better flushing effect as the complete filter chamber(s) 3 will be flushed and the filter chamber(s) 3 will rapidly be drained when the elongated bottom discharge opening 5 is opened at the first openable and closable hatch arrangement 7 by means of the first openable and closable hatch arrangement 7.

The steering arrangement 13 is preferably, but not necessarily, configured to prior performing a filling stage, where material 20 is fed from the material feeding arrangement 9 into the filter chamber(s) 3 of the filter plate pack, to close the elongated bottom discharge opening(s) at the first openable and closable hatch arrangement(s) 7 by means of the first openable and closable hatch arrangement(s) 7 to prevent material 20 from flowing past the first openable and closable hatch arrangement(s) 7. In such case, the steering arrangement 13 can be configured to prior closing the elongated bottom discharge opening(s) 5 at the first openable and closable hatch arrangement 7(s), prior to performing the filtration stage, to firstly close the elongated bottom discharge opening(s) 5 at the second openable and closable hatch arrangement(s) 12 by means of the second openable and closable hatch arrangement(s) 12, and subsequently to fill flushing fluid 17 by means of the flushing fluid feeding arrangement 10 into a space 25 between the first openable and closable hatch arrangement(s) 7 and the second openable and closable hatch arrangement(s) 12 so that an upper level of the flushing fluid 17 is at the level of the first openable and closable hatch arrangement 7. A such arrangement is illustrated in FIG. 2. This will provide for additional strength in closing and sealing the elongated bottom discharge opening(s) 5, because both the first openable and closable hatch arrangement(s) 7 and the second openable and closable hatch arrangement(s) 12 will via the flushing fluid 17 carry the weight and the pressure of the material in the filter chamber(s) 3. In a discharge stage, where filter cake 16 is discharged by gravity from the filter chamber(s) 3, the steering arrangement 13 is preferably, but not necessarily, be configured to firstly drain flushing fluid 17 from the space(s) 25 between the first openable and closable hatch arrangement(s) 7 and the second openable and closable hatch arrangement(s) 12 through the flushing fluid drainage channel(s) 11 before opening first openable and closable hatch arrangement(s) 7 and the second openable and closable hatch arrangement(s) 12 to discharge the filter cake 16 by gravity from the filter chamber(s) 3.

The steering arrangement 13 be configured to during a discharge stage of the filter plate pack to open both the elongated bottom discharge opening 5 at the first openable and closable hatch arrangement 7 and the elongated bottom discharge opening 5 at the second openable and closable hatch arrangement 12 to allow the filter cake 16 to fall by gravity out of the elongated bottom discharge opening 5. An advantage of this is a simple way to discharge filter cake.

The steering arrangement 13 be configured to during a discharge stage of the filter plate pack to
(i) firstly to open the elongated bottom discharge opening 5 at the second openable and closable hatch arrangement 12, while keeping the elongated bottom discharge opening 5 closed at the first openable and closable hatch arrangement 7, and
(ii) subsequently to open the elongated bottom discharge opening 5 at the first openable and closable hatch arrangement 7 to allow the filter cake 16 to fall by gravity out of the elongated bottom discharge opening 5.

This to ensure that filter cake 16 passes the second openable and closable hatch arrangement 12 at a high flow rate to keep the second openable and closable hatch arrangement 12 cleaner.

The steering arrangement 13 can be configured to in a discharge stage, where filter cake 16 is discharged by gravity from each filter chamber 3 of the filter plate pack, to
(i) firstly to open the elongated bottom discharge opening(s) 5 at the first openable and closable hatch arrangement(s) 7 by means of the first openable and closable hatch arrangement(s) 7, while keeping the elongated bottom discharge opening(s) 5 closed at the second openable and closable hatch arrangement(s) 12 by means of the second openable and closable hatch arrangement(s) 12 to allow filter cake 16 to fall by gravity into a space 25 between the first openable and closable hatch arrangement(s) 7 and the second openable and closable hatch arrangement(s) 12, as shown in FIG. 10,
(ii) subsequently to close the elongated bottom discharge opening(s) 5 at the first openable and closable hatch arrangement(s) 7 by means of the first openable and closable hatch arrangement(s) 7, and
(iii) subsequently to open the elongated bottom discharge opening(s) 5 at the second openable and closable hatch arrangement(s) 12 by means of the second openable and closable hatch arrangement(s) 12 to allow the filter cake 16 to fall by gravity out of the elongated bottom discharge opening(s) 5, as shown in FIG. 11.

Especially if the filter is a gas tight filter, such arrangement allows for discharging filter cake 16.

The first openable and closable hatch arrangement(s) 7 is/are preferably, but not necessarily, in the elongate bottom discharge opening(s) 5, arranged at least partly in a first recess (not shown in the figures) in one of the first opposite side walls 27 of the elongate bottom discharge opening(s) 5. This provides for more space for passage of filter cake 16, when the filter chamber (s) are emptied from filter cake 16 by gravity via the elongate bottom discharge opening(s) 5.

The first openable and closable hatch arrangement (s) 7 comprises preferably, but not necessarily, as shown in FIGS. 1 to 5, a first inflatable and deflatable hose seal (not marked with a reference numeral). The first inflatable and deflatable hose seal is preferably, but not necessarily, as shown in FIGS. 1 to 5, fastened at one of the first opposite side walls 27 of the elongate bottom discharge opening 5 so that the first inflatable and deflatable hose seal is in a deflated state configured to be at the said one of the first opposite side walls 27 of the elongate bottom discharge opening 5 and so the first inflatable and deflatable hose seal is in an inflated state configured to extend between the first opposite side walls 27 of the elongate bottom discharge opening 5. Alternatively can the first inflatable and deflatable hose seal be fastened to a separate structure (not shown in the figures)

arranged in the elongated bottom discharge opening(s) 5. Alternatively, the first inflatable and deflatable hose seal(s) can be fastened in the elongated bottom discharge opening(s) 5 by attaching opposite ends of the first inflatable and deflatable hose seal to the filter plate pack. A first support member (not shown in the figures) is preferably, but not necessarily, provided in or at the first inflatable and deflatable hose seal(s) to facilitate keeping the first inflatable and deflatable hose seal(s) straight both in inflated and deflated state. The first inflatable and deflatable hose seal(s) can also be fastened in the elongated bottom discharge opening(s) 5 by means of the first support member(s). The first inflatable and deflatable hose seal(s) is/are preferably, but not necessarily, filled with liquid such as water, when inflated. The liquid filtration apparatus comprises preferably, but not necessarily, a first inflating and deflating arrangement 21 configured to inflate the first inflatable and deflatable hose seal(s) to close the elongated bottom discharge opening(s) 5 at the first inflatable and deflatable hose seal(s) and configured to deflate the first inflatable and deflatable hose seal(s) to open the elongated bottom discharge opening(s) 5 at the first inflatable and deflatable hose seal(s).

The first inflatable and deflatable hose seal(s), when inflated, are configured to exert pressure against the first opposite side walls 27 of the elongated bottom discharge opening 5. The pressure causes friction between the first inflatable and deflatable hose seal and the first opposite side walls 27 of the elongated bottom discharge opening 5, and the friction facilitates closing the elongated bottom discharge opening 5.

Alternatively to first inflatable and deflatable hose seal(s), the first openable and closable hatch arrangement(s) 7 can comprise first mechanical hatches (not marked with a reference numeral) such as plate members mechanically operable for example by means of pneumatic or hydraulic actuators. FIGS. 6 to 9 shows a such filtering apparatus.

The second openable and closable hatch arrangement(s) 12 is/are preferably, but not necessarily, in the elongate bottom discharge opening(s) 5 arranged at least partly in a second recess (not shown in the figures) in said one of the first opposite side walls 27 of the elongate bottom discharge opening(s) 5. This provides for more space for passage of filter cake 16, when the filter chamber (s) are emptied from filter cake 16 by gravity via the elongate bottom discharge opening(s) 5.

The second openable and closable hatch arrangement(s) 12 comprises preferably, but not necessarily, as shown in FIGS. 1 to 5, a second inflatable and deflatable hose seal (not marked with a reference numeral). The second inflatable and deflatable hose seals is/are preferably, but not necessarily, as shown in FIGS. 1 to 5, fastened at one of the first opposite side walls 27 of the elongate bottom discharge opening(s) 5 so that the second inflatable and deflatable hose seal is in a deflated state configured to be at the said one of the first opposite side walls 27 of the elongate bottom discharge opening(s) 5 and so the second inflatable and deflatable hose seal(s) is/are in an inflated state configured to extend between the first opposite side walls 27 of the elongate bottom discharge opening(s) 5. Alternatively can the second inflatable and deflatable hose seal(s) be fastened to a separate structure (not shown in the figures) arranged in the elongated bottom discharge opening(s) 5. Alternatively, the second inflatable and deflatable hose seal(s) can be fastened in the elongated bottom discharge opening(s) 5 by attaching opposite ends of the second inflatable and deflatable hose seal to the filter plate pack. A second support member (not shown in the figures) is preferably, but not necessarily, provided in or at the second inflatable and deflatable hose seal to facilitate keeping the second inflatable and deflatable hose seal straight both in inflated and deflated state. The second inflatable and deflatable hose seal(s) can also be fastened in the elongated bottom discharge opening(s) 5 by means of the second support member(s). The second inflatable and deflatable hose seal is preferably, but not necessarily, filled with liquid such as water, when inflated. The liquid filtration apparatus comprises preferably, but not necessarily, a third inflating and deflating arrangement 23 configured to inflate the second inflatable and deflatable hose seal(s) to close the elongated bottom discharge opening(s) 5 at the second inflatable and deflatable hose seal(s) and configured to deflate the second inflatable and deflatable hose seal(s) to open the elongated bottom discharge opening(s) 5 at the second inflatable and deflatable hose seal(s).

The second inflatable and deflatable hose seal(s), when inflated, is/are configured to exert pressure against the two opposite side walls of the elongated bottom discharge opening 5. The pressure causes friction between the second inflatable and deflatable hose seal and the two opposite side walls of the elongated bottom discharge opening 5, and the friction facilitates closing the elongated bottom discharge opening 5.

Alternatively to second inflatable and deflatable hose seal(s), the second openable and closable hatch arrangement(s) 12 can comprise second mechanical hatches (not marked with a reference numeral) such as plate members mechanically operable for example by means of pneumatic or hydraulic actuators. FIGS. 6 to 9 shows a such filtering apparatus.

The filtering space(s) 2 can have an elongate top opening 6 that is provided at a level above the filter chamber 3 and that is limited by two second opposite side walls 28 and optionally two second opposite end walls. If the filtering space(s) 2 have an elongate top opening 6 at a level above the filter chamber 3, the elongated top opening(s) 6 can be provided with a third openable and closable hatch arrangement 8 that extends across the elongate top opening 6 and that is configured to selectively open and close the elongate top opening 6 at the third openable and closable hatch arrangement 8 by means of the third openable and closable hatch arrangement 8. The third openable and closable hatch arrangement(s) 8 is/are preferably, but not necessarily, in the elongate top opening(s) 6 arranged at least partly in a third recess (not shown in the figures) in one of the second opposite side walls 28 of the elongate top opening(s) 5. The third openable and closable hatch arrangement(s) 8 comprises preferably, but not necessarily, as shown in FIGS. 1 to 5, a third inflatable and deflatable hose seal (not marked with a reference numeral). The third inflatable and deflatable hose seal(s) is/are preferably, but not necessarily, as shown in FIGS. 1 to 5, fastened at one of the second opposite side walls 28 of the elongate top opening(s) 6 so that the third inflatable and deflatable hose seal is/are in a deflated state configured to be at the said one of the second opposite side walls 28 of the elongate top opening(s) 6 and so the second inflatable and deflatable hose seal is/are in an inflated state configured to extend between the second opposite side walls 28 of the elongate top opening(s) 6. Alternatively can the third inflatable and deflatable hose seal(s) be fastened to a separate structure (not shown in the figures) arranged in the elongate top opening 6. Alternatively, the third inflatable and deflatable hose seal(s) can be fastened in the elongated top opening(s) 6 by attaching opposite ends of the third inflatable and deflatable hose seal to the filter plate pack. A third support member (not shown in the figures) is preferably, but not necessarily, provided in or at the third inflatable and deflatable hose seal(s) to facilitate keeping the third inflatable and deflatable hose seal(s) straight both in inflated and deflated state. The third inflatable and deflatable hose seal(s) can also be fastened in the elongated top opening(s) 6 by means of the first support member(s). The third inflatable and deflatable hose seal(s) is/are preferably, but not necessarily, filled with liquid such as water, when inflated. The liquid filtration apparatus comprises preferably, but not necessarily, a second inflating and deflating arrangement 22 configured to inflate the third inflatable and deflatable hose seal(s) to close the elongated top discharge opening(s) at the third inflatable and deflatable hose seal(s) and configured to deflate the third inflatable and deflatable hose seal(s) to open the elongated top opening(s) 6 at the third inflatable and deflatable hose seal(s). The third inflatable and deflatable hose seal(s), when inflated, is/are configured to exert pressure against the second opposite side walls 28 of the elongated top opening(s) 6. The pressure causes friction between the third inflatable and deflatable hose seal and the second opposite side walls 28 of the elongated top opening(s) 6, and the friction facilitates closing the elongated top opening(s) 6. Alternatively to third inflatable and deflatable hose seals, the third openable and closable hatch arrangement(s) 8 can comprise third mechanical hatches (not marked with a reference numeral) such as plate members mechanically operable for example by means of pneumatic or hydraulic actuators. FIGS. 6 to 9 shows a such filtering apparatus.

The filter media 4 extend preferably, but not necessarily, to a level above the optional third openable and closable hatch arrangement 8 in the filtering space(s) 2 of the filter plate pack.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A liquid filtration apparatus comprising:
a series of upright filter plates forming a filter plate pack, wherein filtering spaces are formed in the filter plate pack,
in at least one filtering space a filter chamber is at least partly limited laterally by a filter media,
said at least one filtering space having an elongated bottom discharge opening at a level below the filter chamber,
the elongated bottom discharge opening is limited by two first opposite side walls, and
the elongated bottom discharge opening is provided with a first openable and closable hatch arrangement extending across the elongated bottom discharge opening and configured to selectively open and close the elongated bottom discharge opening at the first openable and closable hatch arrangement,
a material feeding arrangement configured to feed material into filter chambers of the filter plate pack,
wherein the liquid filtration apparatus comprises a pressure arrangement configured to exert pressure on material fed into said filter chamber of the filter plate pack; and
a flushing fluid feeding arrangement configured to selectively feed flushing fluid into said filtering spaces of the filter plate pack, wherein
said at least one filtering space comprises a flushing fluid drainage channel having an inlet and an outlet so that the inlet of the flushing fluid drainage channel is in the elongated bottom discharge opening of said at least one filtering space and so the outlet of the flushing fluid drainage channel is on the outside of the elongated bottom discharge opening of said at least one filtering space, wherein
the elongated bottom discharge opening is additionally provided with a second openable and closable hatch arrangement extending across the elongated bottom discharge opening at a level below both the inlet of the flushing fluid drainage channel and the filter chamber and configured to selectively open and close the elongated bottom discharge opening at the second openable and closable hatch arrangement, wherein
the first openable and closable hatch arrangement extends across the elongated bottom discharge opening at a level above the inlet of the flushing fluid drainage channel; and
a steering arrangement configured to operate the first openable and closable hatch arrangement, the second openable and closable hatch arrangement, the material feeding arrangement, the pressure arrangement, and the flushing fluid feeding arrangement.

2. The liquid filtration apparatus according to claim 1, wherein
the steering arrangement being configured to in a flush stage of the filter plate pack
(i) open the elongated bottom discharge opening at the first openable and closable hatch arrangement by means of the first openable and closable hatch arrangement to allow flushing fluid to flow past the first openable and closable hatch arrangement, and
(ii) close the elongated bottom discharge opening at the second openable and closable hatch arrangement to prevent flushing fluid from flowing past the second openable and closable hatch arrangement and to cause flushing fluid to flow into the flushing fluid drainage channel.

3. The liquid filtration apparatus according to claim 2, wherein
the steering arrangement being configured to open the elongated bottom discharge opening at the first openable and closable hatch arrangement to operate the flushing fluid feeding arrangement to fill the filter chamber with flushing fluid.

4. The liquid filtration apparatus according to claim 1, wherein
the steering arrangement being configured to perform a filling stage to close the elongated bottom discharge opening at the first openable and closable hatch arrangement to prevent material from flowing past the first openable and closable hatch arrangement.

5. The liquid filtration apparatus according to claim 4, wherein
the steering arrangement being configured to close the elongated bottom discharge opening at the first openable and closable hatch arrangement prior to performing the filtration stage to firstly close the elongated bottom discharge opening at the second openable and closable hatch arrangement, and subsequently to fill flushing fluid into the filtering space so that an upper level of the flushing fluid is at the level of the first openable and closable hatch arrangement.

6. The liquid filtration apparatus according to claim 1, wherein
the steering arrangement being configured to during a discharge stage of the filter plate pack to open the elongated bottom discharge opening at the first openable and closable hatch arrangement and to open the elongated bottom discharge opening at the second openable and closable hatch arrangement to allow filter cake to fall by gravity out of the elongated bottom discharge opening.

7. The liquid filtration apparatus according to claim 6, wherein
the steering arrangement being configured to during a discharge stage of the filter plate pack
(i) firstly to open the elongated bottom discharge opening at the second openable and closable hatch arrangement, while keeping the elongated bottom discharge opening closed at the first openable and closable hatch arrangement
(ii) subsequently to open the elongated bottom discharge opening at the first openable and closable hatch arrangement to allow the filter cake to fall by gravity out of the elongated bottom discharge opening.

8. The liquid filtration apparatus according to claim 6, wherein
the steering arrangement being configured to during a discharge stage of the filter pla pack
(iii) firstly to open the elongated bottom discharge opening at the first openable and closable hatch arrangement, while keeping the elongated bottom discharge opening closed at the second openable and closable hatch arrangement to allow the filter cake to fall by gravity into a space between the first openable and closable hatch arrangement and the second openable and closable hatch arrangement,
(iv) subsequently to close the elongated bottom discharge opening at the first openable and closable hatch arrangement,
(v) subsequently to open the elongated bottom discharge opening at the second openable and closable hatch arrangement to allow the filter cake to fall by gravity out of the elongated bottom discharge opening.

9. The liquid filtration apparatus according to claim 1, wherein
the first openable and closable hatch arrangement being in the elongate bottom discharge opening arranged at least partly in a first recess in one of the first opposite side walls of the elongate bottom discharge opening.

10. The liquid filtration apparatus according to claim 1, wherein
the first openable and closable hatch arrangement comprising a first inflatable and deflatable hose seal.

11. The liquid filtration apparatus according to claim 10, wherein
the first inflatable and deflatable hose seal being fastened at one of the first opposite side walls of the elongate bottom discharge opening so that the first inflatable and deflatable hose seal is in a deflated state configured to be at the said one of the first opposite side walls of the elongate bottom discharge opening and so the first inflatable and deflatable hose seal is in an inflated state configured to extend between the first opposite side walls of the elongate bottom discharge opening.

12. The liquid filtration apparatus according to claim 10, wherein
a first support member in or at the first inflatable and deflatable hose seal.

13. The liquid filtration apparatus according to claim 10, wherein
the first inflatable and deflatable hose seal being fastened in the elongated bottom discharge opening by opposite ends of the first inflatable and deflatable hose seal being attached to the filter plate pack.

14. The liquid filtration apparatus according to claim 1, wherein
the first openable and closable hatch arrangement comprising mechanical hatch such as a plate member mechanically operable for example by means of pneumatic or hydraulic actuators.

15. The liquid filtration apparatus according to claim 1, wherein
the second openable and closable hatch arrangement being in the elongate bottom discharge opening arranged at least partly in a second recess in said one of the first opposite side walls of the elongate bottom discharge opening.

16. The liquid filtration apparatus according to claim 1, wherein
the second openable and closable hatch arrangement comprising a second inflatable and deflatable hose seal.

17. The liquid filtration apparatus according to claim 16, wherein
the second inflatable and deflatable hose seal being fastened at one of the first opposite side walls of the elongate bottom discharge opening so that the second inflatable and deflatable hose seal is in a deflated state configured to be at the said one of the first opposite side walls of the elongate bottom discharge opening and so the second inflatable and deflatable hose seal is in an inflated state configured to extend between the first opposite side walls of the elongate bottom discharge opening.

18. The liquid filtration apparatus according to claim 16, wherein
a second support member in the second inflatable and deflatable hose seal.

19. The liquid filtration apparatus according to claim 16, wherein
the second inflatable and deflatable hose seal being fastened in the elongated bottom discharge opening by opposite ends of the first inflatable and deflatable hose seal being attached to the filter plate pack.

20. The liquid filtration apparatus according to claim 1, wherein
the second openable and closable hatch arrangement comprising a second mechanical hatch such as a plate member mechanically operable for example by means of pneumatic or hydraulic actuators.

21. The liquid filtration apparatus according to claim 1, wherein
the filter media extend to a level below the first openable and closable hatch arrangement in the filtering space of the filter plate pack.

22. The liquid filtration apparatus according to claim 1, wherein
the filtering space having an elongated top opening at a level above the filter chamber, and
the elongated top opening being limited by two second opposite side walls.

23. The liquid filtration apparatus according to claim 22, wherein
the elongated top opening being provided with a third openable and closable hatch arrangement extending across the elongated top opening and configured to selectively open and close the elongated top opening at the third openable and closable hatch arrangement, and the steering arrangement being configured to operate additionally the third openable and closable hatch arrangement.

24. The liquid filtration apparatus according to claim 23, wherein
the third openable and closable hatch arrangement being in the elongate top opening arranged at least partly in a third recess in one of the second opposite side walls of the elongate top opening.

25. The liquid filtration apparatus according to claim 23, wherein
the third openable and closable hatch arrangement comprising a third inflatable and deflatable hose seal.

26. The liquid filtration apparatus according to claim 25, wherein
the third inflatable and deflatable hose seal being fastened at one of the second opposite side walls of the elongate top opening so that the third inflatable and deflatable hose seal is in a deflated state configured to be at the said one of the second opposite side walls of the elongate top opening and so the second inflatable and deflatable hose seal is in an inflated state configured to extend between the second opposite side walls of the elongate top opening.

27. The liquid filtration apparatus according to claim 25, wherein
The third support member in the third inflatable and deflatable hose seal.

28. The liquid filtration apparatus according to claim 25, wherein
the first inflatable and deflatable hose seal being fastened in the elongated bottom discharge opening by opposite ends of the first inflatable and deflatable hose seal being attached to the filter plate pack.

29. The liquid filtration apparatus according to claim 23, wherein
the third openable and closable hatch arrangement comprising a third mechanical hatch such as a plate member mechanically operable for example by means of pneumatic or hydraulic actuators.

30. The liquid filtration apparatus according to claim 22, wherein
the material feeding arrangement being configured to feed material into the filter chambers through the elongate top opening.

31. The liquid filtration apparatus according to claim 22, wherein
the filter media extend to a level above the third openable and closable hatch arrangement in the filtering space.

32. The liquid filtration apparatus according to claim 1, wherein
the upright filter plates being arranged aligned and in parallel in the filter plate pack.

33. The liquid filtration apparatus according to claim 1, wherein
the upright filter plates being arranged vertically in the filter plate pack.

34. The liquid filtration apparatus according to claim 1, wherein
the upright filter plates being arranged immovable in contact with each other in the filter plate pack.

35. The liquid filtration apparatus according to claim 1, wherein
filtering spaces being provided within the upright filter plates of the filter plate pack.

36. The liquid filtration apparatus according to claim 1, wherein
filtering spaces being provided between two adjacent upright filter plates of the filter plate pack.

* * * * *